(12) United States Patent
Bhuta et al.

(10) Patent No.: US 6,968,158 B1
(45) Date of Patent: Nov. 22, 2005

(54) WIRELESS TRANSMISSION OF PACKETIZED COMMAND AND IMAGE DATA

(75) Inventors: Mahesh B. Bhuta, Coral Springs, FL (US); Alex C. Wang, Plantation, FL (US); Charles R. Barker, Jr., Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/494,444

(22) Filed: Jan. 31, 2000

(51) Int. Cl.[7] .............................................. H04B 1/00
(52) U.S. Cl. ....................................... 455/68; 455/566
(58) Field of Search ............................... 455/423, 424, 455/425, 67.1, 67.7, 566, 575, 68, 414.1, 455/412.2, 413, 133, 466, 420; 714/55, 748, 714/749; 345/115, 619, 640, 659, 838, 723, 345/762, 764, 534, 606, 612; 710/68

(56) References Cited

U.S. PATENT DOCUMENTS

| | | | | |
|---|---|---|---|---|
| 5,937,331 A | * | 8/1999 | Kalluri et al. | 725/146 |
| 6,011,537 A | * | 1/2000 | Slotznick | 345/733 |
| 6,011,976 A | * | 1/2000 | Michaels et al. | 455/466 |
| 6,154,648 A | * | 11/2000 | Comer | 455/426.1 |
| 6,243,772 B1 | * | 6/2001 | Ghori et al. | 710/68 |
| 6,282,322 B1 | * | 8/2001 | Rackett | 382/248 |
| 6,292,473 B1 | * | 9/2001 | Duske et al. | 370/316 |
| 6,381,448 B2 | * | 4/2002 | Narusawa | 455/133 |
| 6,577,618 B2 | * | 6/2003 | Diachina et al. | 370/348 |
| 6,667,748 B1 | * | 12/2003 | Hubbe et al. | 345/723 |
| 2003/0005463 A1 | * | 1/2003 | Macrae et al. | 725/112 |

* cited by examiner

Primary Examiner—Nay Maung
Assistant Examiner—Tu X. Nguyen
(74) Attorney, Agent, or Firm—Scott M. Garrett

(57) ABSTRACT

Graphical display data representing an image for display is packetized for wireless transmission. At least one command for displaying the image from the data is within the packet. The command is used to display the image, as represented by the packetized data, in related configurations to create an animated display or at predetermined times or intervals to make the image appear spontaneously or be removed after a predetermined period of time for later display or are erased. Transmission of the packetized data occurs when the receiving devise is idle. The transmission of the packets may be interrupted by a present need to establish a communications channel with the receiving device, for example for voice communication or for transmission of hyperlinked data. A handshake protocol is used to assure the parts of the packetized data are successfully downloaded.

18 Claims, 6 Drawing Sheets

WIRELESS TRANSMISSION OF PACKETIZED COMMAND AND IMAGE DATA

TECHNICAL FIELD

The present invention relates to a system, method and apparatus for efficient wireless transmission of packetized image data and command data for display of the image modified by the commands in separate related multiple display configurations to animate the image or to make the image appear at predetermined times.

BACKGROUND

Graphical information, such as bit mapped image data for display of the image in a series of time or space related images to make the image appear animated or to make the image appear at predetermined times, is well known. Examples may be seen in the use of graphical data over the internet. As is well known, the information may be displayed in a series of related images producing the effect of animation. Another well known use is to display the graphical information at discrete times for discrete intervals of time. Where the combined graphical data intended for display and the commands for producing separate respective displays from that graphical information, are conveyed over a broadband transmission medium, separate commands are sent with separate respective images used to produce the animation or to make the image appear at predetermined times. In this way, the image displayed is through the image data displayed according to its respective image data command. In this way each command and its respective image data use up available bandwidth. In the case of wireless transmission, the bandwidth available for data transmission is restricted and the data rate for the transmission of data is reduced accordingly. Where large amounts of data must be wirelessly transmitted to a display device, the time to transmit that data and the load placed on the system increases, creating inefficiencies in the use of the system equipment and the use of available bandwidth.

SUMMARY OF THE INVENTION

To solve the above problems of consuming bandwidth by transmission of image data with its image related command, a system is shown for the wireless transmission of the graphical data of an image which is combined in a packet with at least one command for reproducing the image represented by that graphical image data, in a series of related images or at predetermined times. Graphical image data, image data, or graphical data, means data mapped in a memory in a graphical representation of the image or similarly stored data. In this way the image which is downloaded with its at least one command appears in a series of related images, giving the appearance of animation, or appearing at predetermined times or for predetermined intervals or is erased at a predetermined time. In accordance with principles of the invention as disclosed for the preferred embodiment, the image and command data are contained in a packet which may be according to the User Datagram Protocol (UDP) and delivered using any well known or conventional transmission system such as the Motorola iDEN™ wireless technology. Verification of successful transmission of each element of the packet may be by Acknowledge (ACK) or Not Acknowledged (NACK) signal and a checksum of each packet received.

The disclosed invention according to its inventive principles, may be connected to the Internet, for example, at a central transmitter, as in a duplex radio or cellular telephone system. The command and image packetized information is then delivered wirelessly to a remote device such as a duplex radio or cellular telephone. Each remote device has a microcontroller for storing the packetized data for retrieval and display of the image according to the at least one command contained within the packet. An example of a commercially available system component which may be used to practice the disclosed invention according to its inventive principles is the i1000 plus radio communicator using the iDEN packet data services. The i1000 plus radio communicator product is manufactured by Motorola, Inc., of Schaumburg, Ill., U.S.A.

The size of the message containing the commands and graphical image information may be minimized in a single packet or a series of packets, as would be consistent with the short messaging service (sms) application for remote devices used with limited here bandwidth.

The central station sends the packetized command and image information when the remote device is idle and not receiving or transmitting any information back to the transmitter. In this way, the transmitter is able to monitor the busy/idle state of the remote device and limit its transmission of the packetized data to the remote device's idle time. Any attempt to establish a channel to or from the remote device will produce an interrupt to the downloading of the packetized image/command data.

In operation, the transmitter will receive the image data and commands for displaying those images. An encoder at the transmitter is then used to encode the image data with at least one command in a packet for display of the bit mapped image in a series of bit mapped images, which are modified from the stored image to create an animated display of the image or to make the image appear at predetermined times or for predetermined intervals. Transmission of the packetized data will be delayed until the transmitter senses an idle state at the remote device. Any sensing of a busy state will delay the transmission of the packetized information until the idle/busy state of the remote device switches to idle. An interrupt signal from the remote device, as for example when a communications channel is requested or when a busy signal is sent from the remote device, will cause an interrupt to be produced, stopping the transmission of the packetized data until the next idle state is sensed by at transmitter.

The micro controller of the remote device processes the received packetized commands and image data by storing the data in memory. The micro controller then causes the image to be generated on the display in separate configurations creating an animated display or upon set times or for set intervals or repetitively, or in combination. The commands may include an erase command to remove the packetized data from memory at the expiration of a timed period or after a number of times the image is displayed.

These and other features of the disclosed invention according to the inventive principles are described below in the Detailed Description of the Preferred Embodiment.

DETAILED DESCRIPTION OF THE PREFERRED EMBODIMENT

Figure 1:
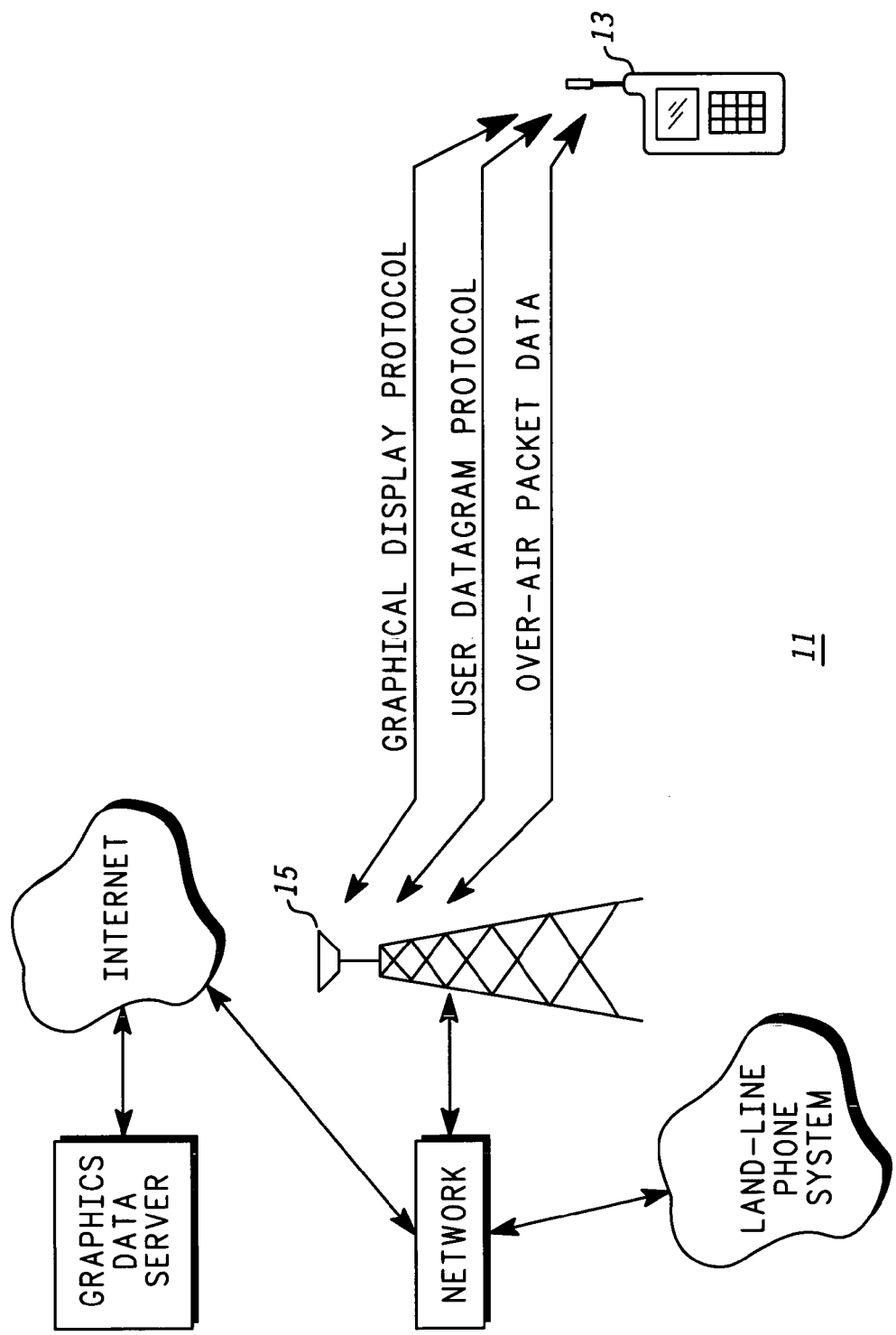
FIG. 1 shows, in general form, a wireless transmission system such as may be used in connection the transmission of packetized command and image data, for example to a cellular telephone and with a central station connected to receive voice, data and video information, for two way radio telephone communication, in accordance with a preferred embodiment of the present invention.

The system and method of the invention, of encoding a packet with image and command data of at least one command for displaying that image in a series of space or time related images, is as shown generally by numeral 11, of FIG. 1. By space related images is meant separate images modified from the image represented by the graphical image data and presented simultaneously. By time related images is meant the image represented by the graphical data image, or space related images appearing at predetermined times or for predetermined intervals. As shown for the preferred embodiment, an image, such as a bit mapped image for example, may be encoded in a packet with at least one command and down loaded from a central station 15 to a remote device 13, such as a cellular telephone or duplex radio, which is alternatively referred to herein as a receiver. The image may then be displayed or stored for later display at the remote device 13, according to the packet encoded commands. The packet encoded commands may be used to actively or dynamically display a time or space related series of images. For example, the image at the remote device 13 may be animated or modified or displayed at a predetermined time or for a predetermined interval or in any combination, as described. In the preferred embodiment, the Motorola iDEN wireless communications services may be used for transmission of the packetized data. However, as would be apparent to one skilled in the art, the disclosed invention is not limited to Motorola iDEN wireless services but may be used with other technologies for the transmission of packet data. The central station 15, as shown in FIG. 1, may be connected to a source of image and command data, as for example to the Internet or through a conventional telephone system.

Figure 2:
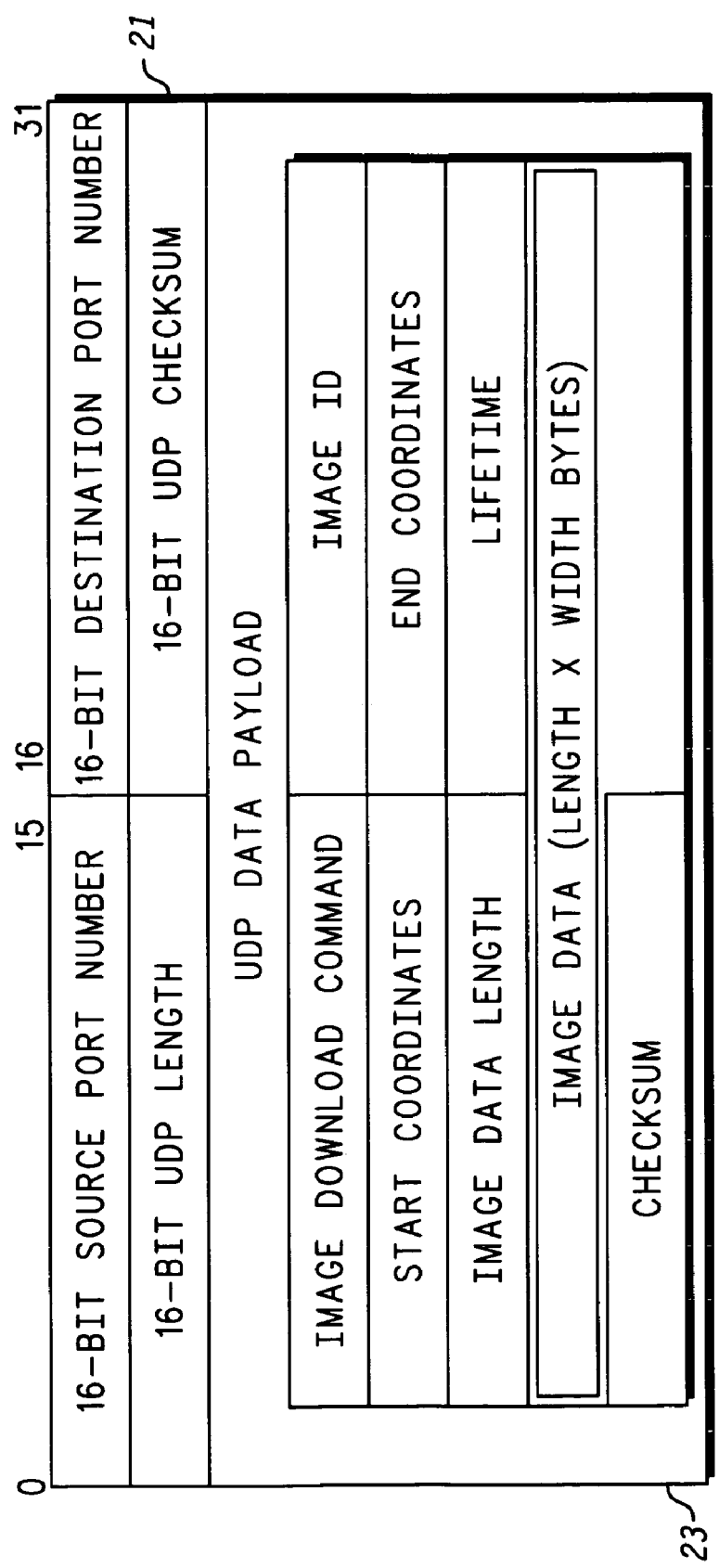
FIG. 2 shows in block form, the structure of the packetized data that may be transmitted in the system of FIG. 1.

The structure for the packetized image and command data is described with reference to FIG. 2. The overall packet structure shown for the preferred embodiment is in the User Datagram Protocol, as would be known to those of ordinary skill in the art. However, as would be known and understood by those of ordinary skill in the art, the inventive principles are not limited to the data structure shown, but may be used with other data structures. The structure of the packetized data 20 is shown for example in FIG. 2. The packetized data includes a UDP Data Payload 21 with a 16 bit Source Port number, Destination Port number, UDP length number and Checksum. The image data/command part of the packet is shown generally as 23, and includes an exemplary Image Down load command. The command includes fields of information including an Image ID, Image start coordinates, Image end coordinates, Image Data length, Image Lifetime, Image Data (length times width number of Bytes), and a Check sum. The packet may be encrypted or compressed for transmission and decrypted and decompressed at the receiver, as would be well known to one of ordinary skill in the art.

According to the inventive principles of the disclosed invention, each packet containing graphical image data, will have at least one command for the active or dynamic display of the graphic image represented by said graphical image data, in a series of space or time related series of bitmapped related images to create an animated display or a display of the image at predetermined times or for predetermined intervals. Animation may be by displaying a series of related images, modified from the image data and displayed over time to give the impression of animation, as would be well known to one of ordinary skill in the art. Examples of the commands which may be used in accordance with the principles of the invention to animate or modify the image or set the time for the image to be displayed or expire and to be erased from memory are, shown in Fixed Network Equipment (FNE) to Mobile Subscriber Command Sets, as follows:

Image Download: <download command> <image ID> <starting coordinates> <end coordinates> <image data length> <life time> <image date> <image data> <checksum>.

Image specific command: <Image ID> <rotate image> <checksum>.

Image specific command: <Image ID> <Image Fades In> <checksum>.

Image specific command: <Image ID> <Fades Out> <checksum>.

Image specific command: <Image ID> <Expire Now> <checksum>.

Image specific command: <Image ID> <Display Duration> <checksum>.

Image specific command: <Image ID> <Display Frequency> <checksum>.

Hyperlink: <Hyperlink Command> <Image ID> <Coordinates on the Image> <Message> <Scroll> <Checksum>.

Query Memory: <Query Command to Subscriber> <Checksum>; and in the.

MS to FNE Command Sets, as follows,

Query Response: <Query Response Command> <Memory Space Available> <Checksum>.

Command ACK/NACK: <Command ACK/NACK> <Checksum>.

Figure 3:
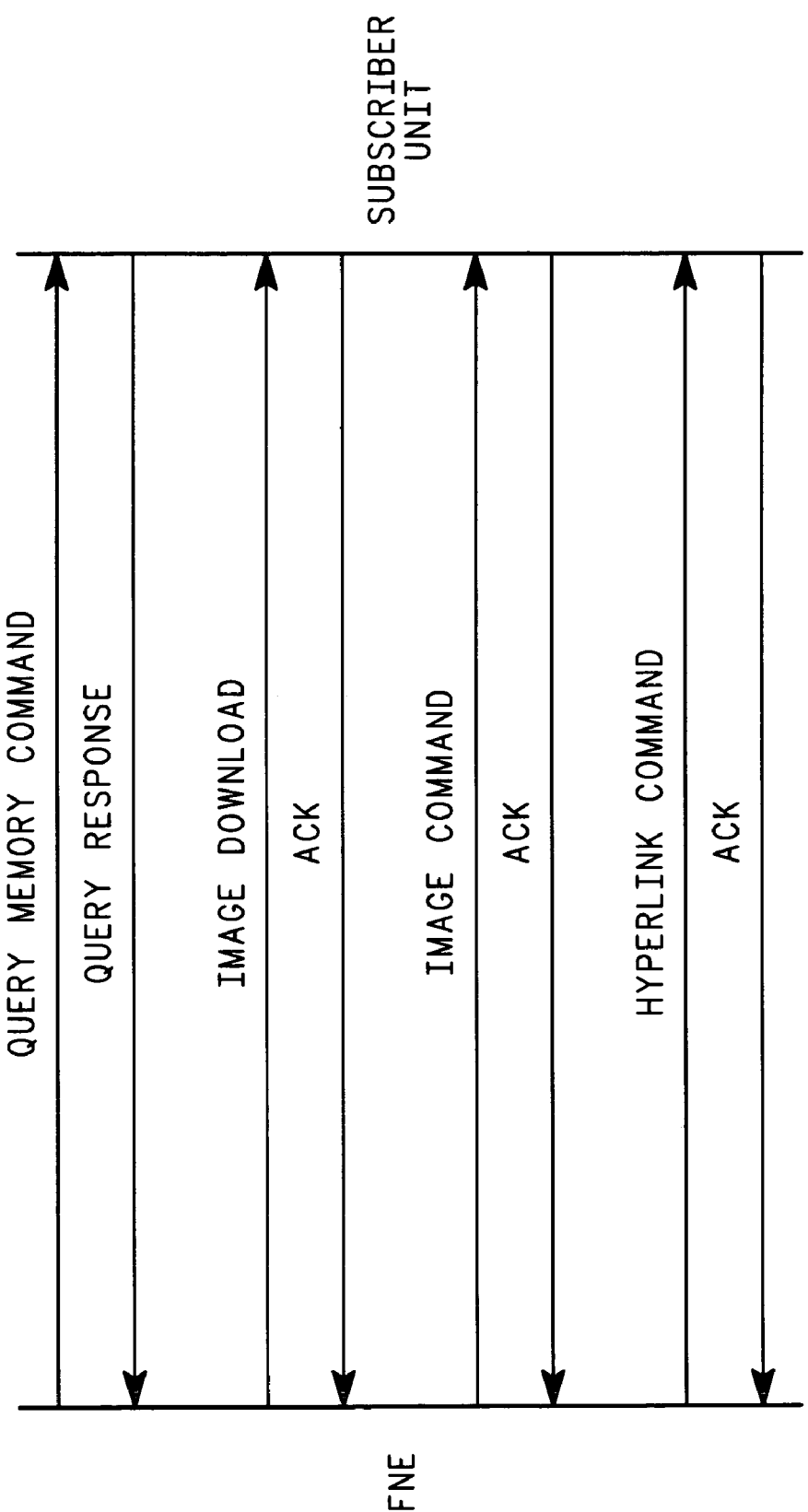
FIG. 3 shows the transmission protocol which may be use to acknowledge the separate parts of the packetized image data as shown in FIG. 2.

Each message Checksum is to ensure the integrity of the message. The <Image ID> is generated according to an algorithm to ensure each image ID is unique to distinguish between the images stored in the receiver. The transmission protocol may use an ACK to acknowledge reception of the separate parts of the image data packetized with at least one command, or several commands as shown in FIG. 3. In the event the remote device 13 does not ACK the last transmission, or should a specific NACK occur, the FNE may use a random back off algorithm to complete the transmission at a later time. As shown in FIG. 3, at least one command is sent with the Image downloaded to the remote device. The last command, as illustrated in FIG. 4 for the preferred embodiment, is the Hyperlink command.

While one packet is shown with image data and at least one command for displaying the data in separate configurations or at separate times, the image and command data may be sent in several related packets, as in the cellular related short message service (SMS).

Figure 4:
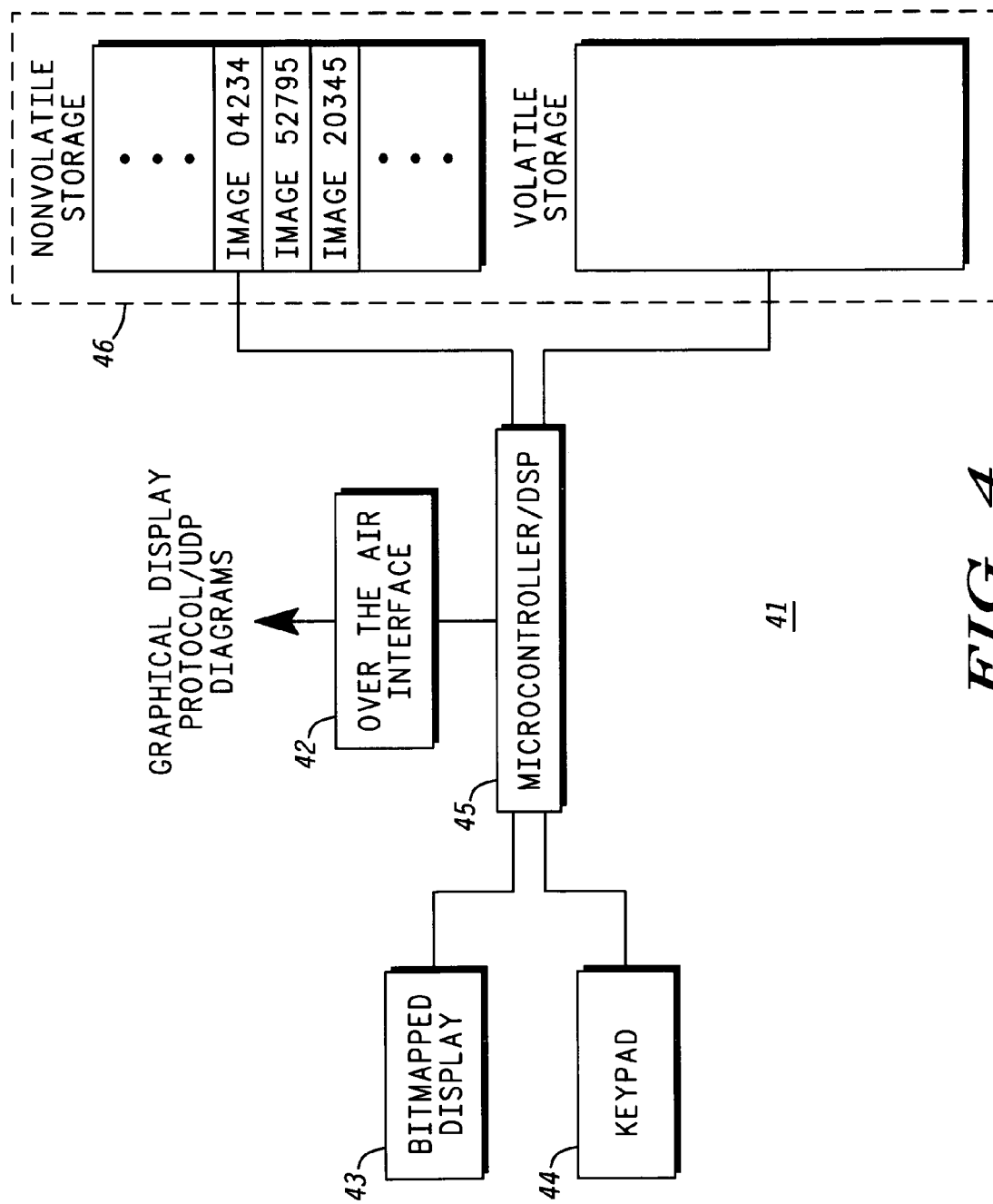
FIG. 4 shows in block form, the configuration of the radio telephone which may be used to receive and process the packetized image data according to the preferred embodiment of the present invention.

The configuration of a remote device 13 which may be used according to the disclosed inventive principles is as generally shown by numeral 41 in FIG. 4. The unit 41 includes a wireless interface 42 as would be well known to one of ordinary skill in the art, for receiving and transmitting at radio frequencies. Shown electrically connected to the wireless interface is a data processor with constituent parts shown as a keypad 44, a bit mapped display 43, a microcontroller/digital signal processor 45 and memory, shown as volatile and non volatile memory 46. The transmitter or central station 15, would have the same or similar equipment as shown in FIG. 4 for the remote device or receiver 13, as shown in FIG. 1. The encoding of the image and command data into packetized data, shown in FIG. 2, at the respective transmitter or receiver microcontroller/DSP, is well known by those of ordinary skill in the art. Packetized data received at the remote device 13, once decoded, would be used to display the image represented by the image data, in a bit mapped display as shown in FIG. 4, according to at least one command included in the packet as described in reference to FIG. 2.

Figure 5:
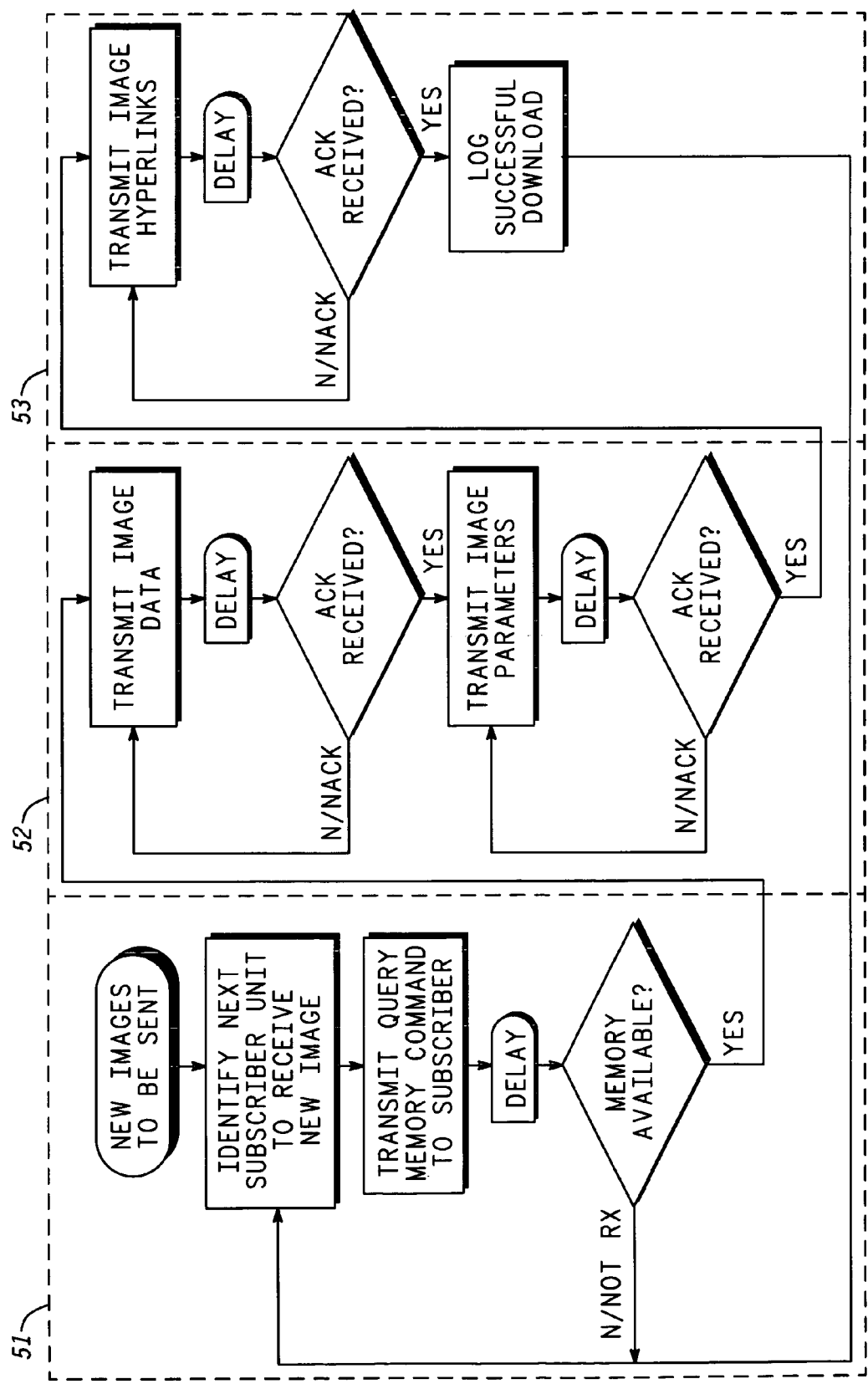
FIG. 5 shows the process for transmitting and displaying the image represented by the graphical image data, according to the commands associated with the image data.

The process for transmitting an packetized image with at least one command for actively or dynamically displaying the image represented by the graphical image data, is shown in reference to FIG. 5. According to the inventive principles of the disclosed invention, the process for wirelessly downloading a packetized single image with one or more commands for altering that image at the remote device and creating an active or dynamic display, recreating that image in a series of images, as described above, starts with the packetized data at central station 15. The steps in the process may be described with reference to the Blocks 51, 53, and 55. As shown in Block 51, where there is new packetized data for transmission, the central station 15 proceeds through a series of steps for determining the next remote device 13 to receive the information, whether that remote device 13 is busy or idle and whether memory is available. Each step in the process of Block 52 may be by an ACK or NACK, as is well known to those of ordinary skill in the art and as shown in reference to FIG. 3. Part or all of the process steps shown in reference to FIG. 5, may be altered or modified or bypassed without departing from the inventive principles shown or described. Block 52 shows the process of transmitting the separate parts of the packet as shown in FIG. 2 and FIG. 3. As shown, each step of transmitting the data parts within the packet of FIG. 2, may be followed by separate respective ACK's, as shown in reference to FIG. 3. As shown in Block 55 the Hyperlinks commands, well known to those of ordinary skill in the art, may be sent as the last command followed by the logging of a successful download.

The system and the method shown, includes the determination by the central station 15 of whether the remote device 13, is idle or busy. The idle/busy state may be determined at the central station 15 by monitoring the remote device 13 in a plurality of ways, which is well known to those of ordinary skill in the art. In the preferred embodiment, the central station sends a Query Response, as shown in FIG. 2, which is used to determine if the remote device 13 is busy and unable to receive the packetized information or is idle or idle with memory available for receiving and storing the packetized information. A response indicating the remote device 13 is busy produce a delay followed by a repeated attempt to determine the status of the remote device 13 and to download the packetized information.

Figure 6:
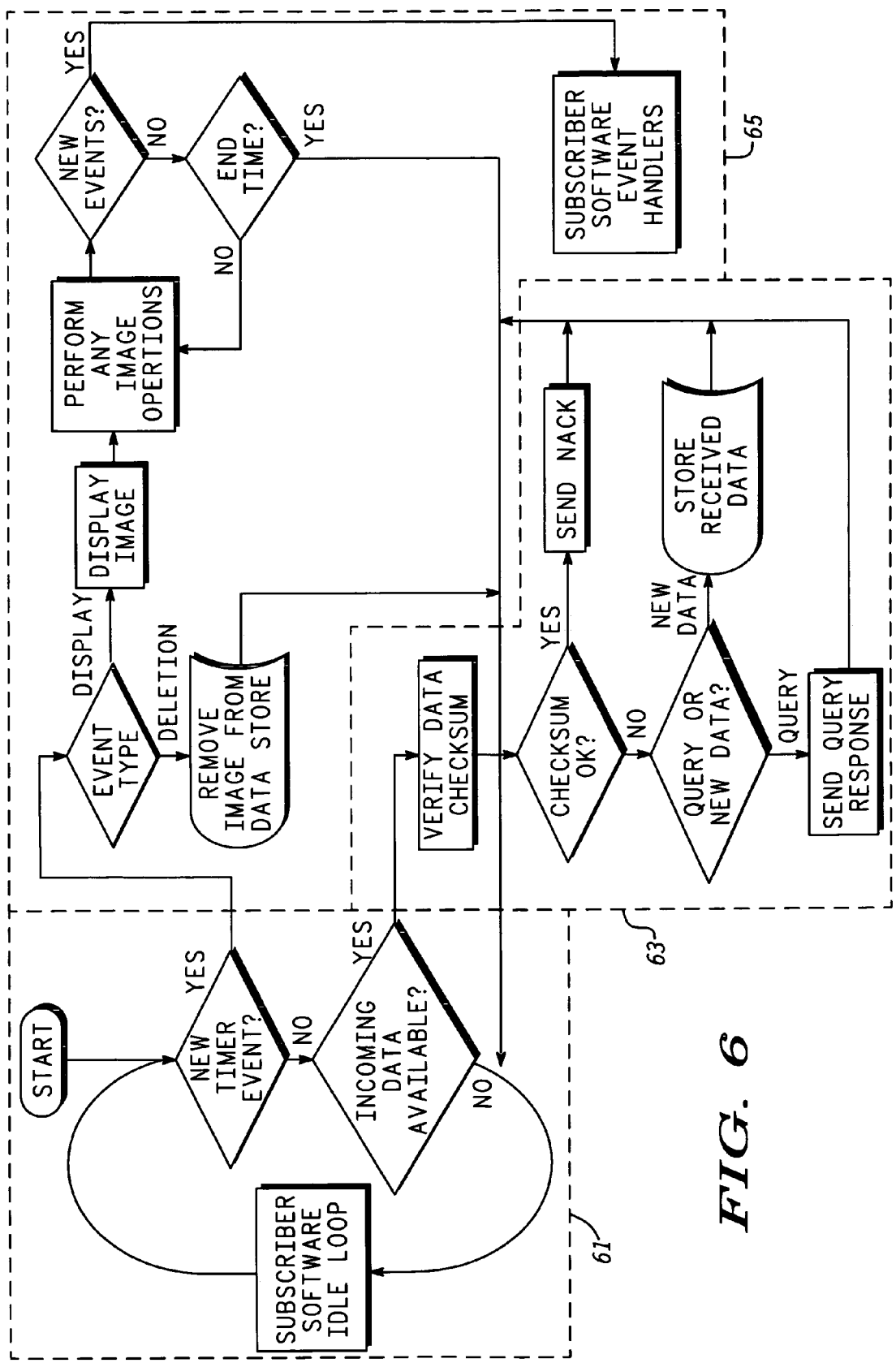
FIG. 6 shows the process for interrupting the display process, as shown in FIG. 5, when a call is made to the radiotelephone or a call is initiated to the radiotelephone.

An idle loop and the process for receiving the packets, for displaying the images, for interrupting the process when there is an incoming data packet from the central station 15 or an interrupt at the remote device 13 to initiate a transmission, for example, is as shown with reference to FIG. 6. The idle loop is shown in Block 61, as a software loop, interruptible in response to the occurrence of a timed event or the availability of an incoming data packet. The occurrence of an incoming data packet starts the process shown in Block 63, where the image data and the at least one command, as shown in FIGS. 2 and 3, are down loaded and placed in memory for display of the image in accordance with the at least one command sent in the packet or series of packets, for performing any image operations and creating a dynamically display of that image. The process of displaying the image in accordance with the commands, is as shown in Block 65, wherein the image may be space related to create the appearance of animation or time related for appearance at predetermined times or for predetermined intervals.

The software and computer data processors according to the inventive principles of the disclosed invention as would be used in connection with the preferred embodiment would be well known to those of ordinary skill in the art and for that reason are not described. An example of a remote device which may be used in connection with the preferred embodiment is the Motorola i1000 plus for the remote device 13 and the Motorola iDEN packet data FNE for the central station 15.

What has been shown and described is a system and method for transmitting data of an image wirelessly with the image sent with associated commands for manipulating the image in a space relation by animation for example or in time by timing the beginning, end or duration of the display, or the expiration of the display and its erasure from the receiver memory. However, the invention disclosed should not be limited to the particular components disclosed in connection with the preferred embodiment.

We claim:

1. A System for the wireless transmission and receiving of commands and information for display in response to the commands, comprising:
   a. a receiver;
   b. a transmitter;
   c. said transmitter including an encoder for encoding into a data packet graphical image data and at least one command for the display of said graphical image data;
   d. said transmitter including a wireless transmitter for wireless transmission of said data packet to said receiver;
   e. said receiver including a wireless receiver for wireless receiving of said data packet;
   f. a memory electrically coupled to said wireless receiver for receiving and storing said data in said data packet;
   g. a controller electrically coupled to said memory;
   h. a display connected to said controller;
   i. said controller in response to said image and said at least one command in said data packet dynamically displaying on said display said image represented by said graphical image data, and wherein said at least one command in said data packet is for the display of said image at predetermined times of the day.

2. The System of claim 1, wherein said controller modifies said image and displays said images as a series of space related images.

3. The System of claim 1, wherein said space related images create the appearance of an animated image.

4. The System of claim 1, wherein said receiver includes a transmitter controller for transmitting to said transmitter a request signal to establish a communication channel and said transmitter interrupts said transmission of said data packet in response to receiving said request signal.

5. The System of claim 4, wherein said transmitter controller queries the state of said receiver to determine if said receiver is in an idle or busy mode and transmits said data packet to said receiver in response to an indication said receiver is idle.

6. The System of claim 1, wherein said controller modifies said image and displays said images as a series of time related images.

7. The System of claim 6, wherein said at least one command in said data packet is for the display of said image at predetermined intervals of time.

8. The System of claim 3, wherein said at least one command in said data packet is for the display of said space related images in a series.

9. The System of claim 6, wherein said at least one command is for the display of said image and the termination of said message at a predetermined time.

10. The System of claim 9, wherein said at least one command is for the repetitive display of said image at said predetermined time.

11. The System of claim 10, wherein said at least one command is for the removal of said graphical display data.

12. he System of claim 10, wherein said at least one command is for the removal of said graphical display data at a predetermined time.

13. The System of claim 10, wherein said at least one command is for the removal of said graphical display data after a predetermined number of displays of said image.

14. The System of claim 1, wherein said receive responds to the successful transmission of said graphical image data or said at least one command with a signal indicative of said successful transmission.

15. The System of claim 1, wherein said transmitter includes a data base of attributes for respective receivers and said controller is connected to said data base for identifying a respective attributes and including in said data packet a predetermined command in response to said respective attribute.

16. The System of claim 1, wherein said data packet includes a repeat command and said receiver controller repeats the display of said image in response to said repeat command.

17. A receiver for the reception and display of packetized graphical image data and at least one command for the dynamic display of the image represented by said data, comprising:
   a. a receiver for wireless receiving of a packet encoded with graphical image data and at least one command for the display of the image represented by said graphical image data, wherein said receiver includes a data base of attributes for respective transmitters;
   b. a memory electrically coupled to said receiver for receiving and storing said data in said data packet;
   c. a controller electrically coupled to said memory, and said controller is connected to said data base for identifying respective attributes and including in said data packet a predetermined command in response to said respective attribute;
   d. a display electrically coupled to said controller;
   e. said controller in response to said image and said at least one command in said data packet dynamically displaying on said display said image represented by said graphical image data.

18. The receiver of claim 17, wherein said receiver responds to the successful transmission of the said data in said data packet with a signal indicative of said successful transmission.

* * * * *